Oct. 9, 1962    L. M. SCHENCK    3,057,889
METHOD FOR PRODUCTION OF ACYL TAURIDES
Filed April 11, 1960
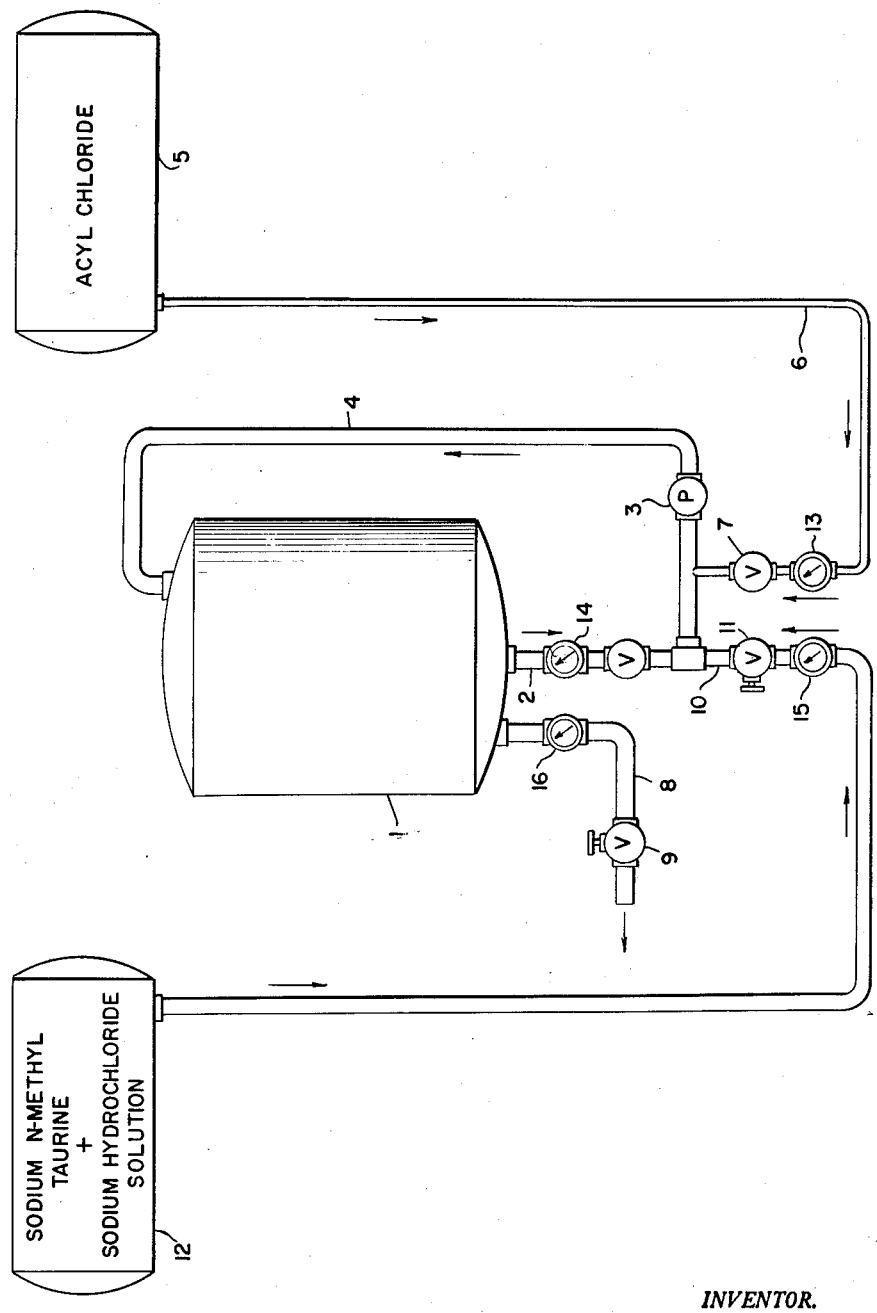
INVENTOR.
LESLIE M. SCHENCK
BY
*George L. Ford*
ATTORNEY United States Patent Office 3,057,889
Patented Oct. 9, 1962

3,057,889
METHOD FOR PRODUCTION OF ACYL TAURIDES
Leslie M. Schenck, Mountainside, N.J., assignor to General Aniline & Film Corporation, New York, N.Y., a corporation of Delaware
Filed Apr. 11, 1960, Ser. No. 21,416
5 Claims. (Cl. 260—401)

This invention relates to an improved method for the production of acyl alkyl taurides represented by the following general formula

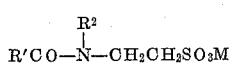

wherein the group R'CO— represents the acyl radical of a higher aliphatic saturated or unsaturated carboxylic acid (the group R' representing a saturated or unsaturated hydrocarbon group containing 8 to 24 carbon atoms, preferably 12 to 18 carbon atoms), $R^2$ represents a member of the group consisting of hydrogen and alkyl and cycloalkyl radicals of from 1 to 8 carbon atoms and M represents hydrogen or a suitable cation usually alkali metal and more usually sodium or potassium although M may represent ammonium or an alkaline earth metal, e.g. calcium, magnesium, strontium, barium or salt forming amines such as mono-, di- or triethanol amine, cyclohexylamine, guanidine and the like.

Such acyl alkyl taurides are well known in the art and are described for example in U.S. Patent 1,932,180 of Guenther, Munz and Haussmann. They have found extensive use as surface active agents in textile laundry and related industries, particularly as wetting, cleansing, softening and dispersing agents. Industrially, these acyl alkyl taurates are normally formed by condensation of a fatty acid halide, normally a fatty acid chloride, with a β-sulfoaminoalkane such as N-methyl taurine, N-cyclohexyltaurine and the like (the Schotten-Baumann reaction). The production of sodium N-methyl taurides of fatty acids may be represented by the following equations:

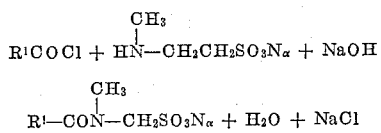

The details of an industrial process for the manufacture of these acyl alkyl taurides are given in an article by Kastens and Ayo, Industrial and Engineering Chemistry, September 1950, vol. 42, pages 1626 to 1638. In this process which is a batch operation, there is appreciable hydrolysis of the acid chloride resulting in the formation of soap as a by-product.

Since the presence of soaps admixed with acyl taurides interferes with their lathering properties, it is desirable to keep the hydrolysis at a minimum. This is normally accomplished by maintaining low temperatures during the reaction and using excess molar ratios of the taurine. However, since the slurries of acyl taurides found in commercial manufacture are quite viscous at low temperatures, adequate agitation in the batch process becomes a significant problem especially toward the end of the reaction and lack of physical contact between the acyl chloride and appropriate taurine promotes hydrolysis rather than tauride formation.

More recently in U.S. Patent 2,903,466 and British patent specification 783,038 there is described a continuous process for the production of acyl taurides by simultaneously metering in 2 streams, one consisting of acyl chloride and the other of an admixture of sodium methyl taurine, water and sodium hydroxide into a mixing apparatus designed for continuous and violent mixing. The temperature of the reaction is preferably maintained within the range of 60 to 88° C. and the actual ratio between the two streams is adjusted to obtain a product of about pH 8. The violent mixing reduces the hydrolysis of the acyl chloride and allows the continuous production of the acyl tauride in good quality and at higher temperatures than is possible in the batch process. A molar ratio of alkali metal hydroxide to alkali metal taurine is given as usually within the range of 1.1:1 to 1.4:1, preferably about 1.2:1. In the process of this British patent it is apparent that the methyl taurine content of the product will be dependent on the pH of the ensuing stream of acyl tauride and that an excess of taurine must be carried at all times to allow for changes in pH of the product stream during continuous production. This British patent discloses a conversion of sodium methyl taurine equalling 91.0% when operating at a pH of 7 contrasted with 88.9% conversion at pH 8.0 and 84.7%, conversion at pH 9.0 using the same feed stocks at each instance.

I have now found that acyl taurides can be obtained in good yield by introducing an acyl chloride (of the particular fatty acid whose tauride it is desired to produce) into a stream of an aqueous solution of a taurine and alkali while regulating the rate of introduction of the acyl chloride so that there is at least about 10% excess of the taurine present on mixing, and more preferably an excess of taurine in the range of 50–100% not only to minimize any tendency for hydrolysis but also to eliminate the necessity for elaborate and very stringent controls. Under these conditions, essentially all the acyl chloride reacts with the taurine to form the acyl tauride so that there is obtained an aqueous mixture of acyl tauride and an excess of taurine and alkali. This mixture is then recirculated and further acyl chloride mixed with the recirculating stream at such a rate that there is still at least about 10% excess of free taurine present on mixing. Such recirculation is continued until the conversion has proceeded to the desired extent. My novel process and the advantages thereof can most readily be fully described by consideration of specific embodiments of this invention.

Reference should, therefore, now be made to the accompanying sheet of drawings, the single FIGURE of which is a diagrammatic representation of the apparatus suitable for practice of the present invention.

In brief, in practicing the present invention a conventional storage tank 1 is charged with the amount of sodium methyl taurine, caustic and water required to react with acyl chloride to produce an acyl tauride slurry of the desired concentration. This charge in kettle 1 is continuously withdrawn therefrom through line 2, having flow meter 14 therein, by pump 3 and passes from pump 3 through line 4 and is returned therethrough to the tank 1. Simultaneously, acyl chloride is withdrawn from storage tank 5 and introduced through line 6 into the inlet of pump 3. The rate of feed and acyl chloride through line 6, as shown by flow meter 13, is controlled by valve 7 so that there is always a substantial excess (at least about 10% excess although as more fully pointed out below I prefer to have a 50 to 100% excess) of sodium methyl taurine over that required to completely react with the acyl chloride introduced into pump 3. Pump 3 may be of conventional construction such as a conventional gear pump. The stream withdrawn from tank 1 through line 2 containing sodium methyl taurine is mixed with the stream of acyl chloride introduced through line 6 in the pump 3 and the mixture returns through line 4 to tank 1. The acyl tauride is formed rapidly following the mixing.

Further details of the present invention will be clearly apparent from a consideration of the following more detailed description thereof.

Assuming that it is desired to produce 18,450 pounds of acyl tauride of molecular weight 363 (e.g. sodium salt of coconut fatty acid N-methyl tauride) as a 25% aqueous slurry, it is apparent that there would be required 12,800 pounds (54.2 moles) of 100% acyl chloride of average molecular weight of 238.5 (e.g. coconut fatty acid chlorides), 9100 pounds of sodium methyl taurate (56.5 moles), 2900 pounds of sodium hydroxide (72.5 moles) and 49,000 pounds of water. In accordance with the present invention, the tank 1 is therefore charged with all of the sodium methyl taurate, sodium hydroxide and water required for the reaction for a total charge of 61,000 pounds having an aqueous density of about 1.1. Pump 3, which may for a charge of this size conveniently have a capacity of about 300 gallons per minute, is started and it is apparent that the pump will move over 2700 pounds per minute of the mixture in tank 1, or at the start up 2.5 moles of sodium methyl taurate. Acyl chloride which is stored in tank 5 is therefore introduced into pump 3 at such a rate that there is approximately a 100% excess of sodium methyl taurine introduced into pump 3 over that required, to react with the acyl chloride being introduced into pump 3, for acyl tauride formation. At the start of the reaction therefor the rate of feed of acyl chloride can be about 300 pounds per minute. Assuming that a 90% conversion of sodium methyl taurine to acyl tauride is desired; it is apparent that at the end of the reaction the acyl chloride addition can be at the rate of 20 pounds per minute while still maintaining approximately a 2:1 molar excess of taurine to acyl chloride in the feed to pump 3. This molar excess of taurine to acyl chloride promotes the desired acyl tauride formation. The overall average addition of the acyl chloride therefore is 160 pounds per minute and the reaction time for completion of a batch of the above size is 1½ hours.

Among the several obvious advantages of my invention the following points should be emphasized:

(1) No complicated metering system is required. The given weight of acyl chloride to be added at a given time to maintain an appropriate molar ratio of taurine and acyl chloride so that on mixing the two there is always an excess of taurine present can easily be read from a pre-established graph.

It is noteworthy that slower addition rates of acyl chloride can only benefit the reaction, and that, in the operation described immediately above, even with excesses up to 100% of the predetermined rate of acyl chloride addition a sufficient molar quantity of taurine is present to allow complete reaction.

(2) At any given time, the batch can be analyzed for product, methyl taurine, or caustic, and any adjustment in concentrations made without jeopardizing the production.

(3) While I consider the reaction as normally completed, when the conversion of sodium methyl tauride to acyl taurate is about 90% of theoretical conversion; it will be understood, that if desired, essentially 100% conversion can be attained, at the expense of time cycle, by continuing to feed in the acyl chloride at a diminished rate after conversion has reached about 90% of theoretical. If this is done, additional caustic may be necessary, since it is preferable to maintain a pH of 7–14 in the exit stream from the pump at all times. It will also be understood that if desired the reaction can be stopped before a 90% of theory conversion is attained.

(4) The batch size is limited only by the volume of the tank, but or kettle connected to the pump.

(5) The time cycle is limited only by the capacity of the recirculating pump, which may be of the gear, lobetype, centrifugal, or similar type. No pump especially designed for violent mixing is required.

(6) With suitable piping, a production of acyl tauride may be made directly in the tank car or tank wagon employed for delivery of the product to the consumer.

(7) No external cooling is required. My preferred operating temperature may vary from 15° C. to 100° C.

(8) In the prior art, acyl tauride slurry concentrations have been limited by considerations of agitation and packing to 25–35% acyl tauride. In my invention, slurries up to 50% activity are attainable in commercial production.

(9) Final pH adjustment of the product can be easily attained by addition of either acid or caustic into the recirculating system.

Theoretically a high yield of acyl tauride can be obtained, with minimum hydrolysis of the acyl chloride, by mixing a stream of acyl chloride with an aqueous stream of taurine salt and free alkali, provided there is present a slight excess of taurine salt, over that necessary to combine with the acyl chloride to form the tauride, and also a slight excess of free alkali over that necessary to combine with the hydrochloric acid liberated by the amide formation. Nevertheless, in actual practice, it has been found that with such operation very vigorous mixing is necessary and also very stringent control of the rate of feed of both the stream of acyl chloride and the stream of taurine salt and alkali. Should the rate of addition of the acyl chloride be less than that at which the taurine salt is added, even for a short period, it is apparent that the product produced will contain an excessive amount of unreacted, and thus lost, taurine salt. If the rate of addition of the stream of taurine and caustic, at any time should be less than that at which the acyl chloride is added, it is apparent that the product produced will necessarily contain an excess amount of free fatty acid or soap as a result of hydrolysis. In operating in this manner, therefore, it is necessary, in order to achieve satisfactory results, not only to have very accurate control for the rate of feed of both the stream of acyl chloride and the stream of taurine and caustic, but also to continuously analyze the resulting product and take prompt remedial action in the event of any difficulty. It will be apparent, however, that by operating in accordance with the process of the present invention, i.e. introducing the acyl chloride into a recirculating stream of already formed acyl tauride which contains some unreacted taurine and caustic, that by means of this recirculation it is possible to provide a substantial margin of safety and assure that there will at all times be an excess of taurine salt present when the acyl chloride is introduced, thus assuring minimum hydrolysis and maximum yield of desired acyl tauride. Any variation in the rate of feed of acyl chloride will not give immediate rise to undesirable operating conditions but in the event of any such variation undesirable operating conditions will arise only slowly and can be readily detected and remedied before the amount of acyl chloride introduced exceeds the amount of taurine salt and caustic so as to give rise to excessive hydrolysis and uneconomic operating conditions. Thus not only can the equipment be considerably simplified but satisfactory reaction conditions can be maintained much more readily.

The following examples illustrate more clearly the operation of my invention. The examples cited are intended to teach, but not to limit, the scope of my invention to those who are skilled in the art. The term FFA means free fatty acid, or soap calculated as the free fatty acid. The term "activity" refers to the actual content of alkali metal acyl tauride.

*Example 1*

A 500 gallon stainless steel tank 1 was connected through its bottom outlet with 1" stainless steel pipe 2 to the inlet port of a Viking gear pump 3 rated at 5 g.p.m. A 1" stainless steel pipe 4 was run from the exit port of the pump to the top of the storage tank.

Provision was made for the introduction of acyl chlorides by gravity into the recirculating stream by welding in a ¼" stainless steel pipe 6 into the 1" pipe 4" behind the inlet port of the recirculating pump.

There was charged into the stainless steel tank 1310 lbs. (393 lbs. 100% N-methyl taurine, M.W. 139), as the aqueous solution of its sodium salt.

344 lbs. of commercial 50% sodium hydroxide solution and 730 lbs. water. The solution was recirculated 30 minutes to insure adequate mixing, and 894 lbs. of oleic acid chloride, M.W. 300.5, was added by gravity into the recirculating stream through the previously described ¼" acyl chloride inlet tube on the inlet port side of the recirculating pump. The addition was made over a three hour period, with the initial rate being 15 lbs./minute, graduating to 0.5 lb./minute at the end of the addition to insure an adequate excess of methyl taurine and a pH range of 7–14 at all times. A temperature increase from 20° C. to 78° C. was obtained during the course of the reaction. There was packed out 3,270 pounds of the sodium oleoyl methyl tauride with an activity of 35.1%, methyl taurine content of 0.97%, pH 7.6, and FFA (100% basis) of 4.2% showing a 95.7% conversion of methyl taurine to the desired acyl tauride.

*Example II*

Employing the same equipment and general procedure as outlined in Example I, a solution of 1113 lbs. (318 lbs. 100% methyl taurine, M.W. 139), as the aqueous solution of its sodium salt, 262 lbs. of aqueous 50% sodium hydroxide, and 1040 lbs. water were reacted over two and one-half hours with 585 lbs. of coconut fatty acid chloride, M.W. 238.5, at a pH range of 7–14 and a temperature range of 18° C. to 87° C. to produce 2996 lbs. of a 25.7% active sodium coconut acid methyl tauride containing 0.83% residual methyl taurine, 3.65% FFA, 5.9% sodium chloride, and a final pH of 7.35. Based on acyl tauride produced, 92.7% of the available methyl taurine was consumed.

*Example III*

Using the same equipment and procedure as in Example I, 246 lbs. of potassium cyclohexyltaurate and 73 lbs. 100% potassium hydroxide were dissolved in 100 lbs. water, and 218.5 lbs. lauric acid chloride added as previously described at a pH of 7–14 over one hour at 40–93° C. The resultant slurry of potassium salt of palmitic cyclohexyltaurate analyzed 26.1%, indicating 93.79% conversion of the taurine to tauride.

It will be understood that the foregoing examples are illustrative of preferred embodiments of the present invention and that the invention may be applied without modification to the preparation of other acyl taurides. Thus valuable surface active agents are obtained by reaction of acyl chlorides of fatty acids of 8 to 24 carbon atoms. Illustrative of fatty acids as acyl chlorides in the present invention may be mentioned in addition to oleic acid, coconut fatty acid and lauric acid whose chlorides were employed in the foregoing examples, there may be mentioned palmitic acid, stearic acid, linoleic acid, acids obtained from natural fats and oils such as tallow fatty acids, soybean fatty acids, linseed oil fatty acids, acids obtained by oxidation of selected petroleum fractions, acids obtained by oxidation of oxo alcohols and others. It will also be understood that while acyl N-methyl taurides and acyl N-cyclohexyl taurides of fatty acids have found largest commercial use, that other taurides may be produced by using in place of N-methyl taurine or N-cyclohexyl taurine, either taurine itself, or other alkyl and cycloalkyl taurines, e.g. N-ethyltaurine, N-propyltaurine, N-amyltaurine, N-octyltaurine and the like.

It will also be apparent that various modifications may be made in the precise details of the foregoing examples without departing from the scope of the present invention. Thus while it is preferred as a practical matter to maintain a constant rate of circulation of material containing taurine and caustic from tank 1 through pipe 2, pump 3 and pipe 4 and to vary the rate of introduction of acyl taurine into this circulating stream, it is possible, if one so desires, to maintain a constant rate of addition of acyl chloride and as the reaction proceeds, increase the rate of circulation of the stream containing taurine into which the acyl chloride is introduced so that on mixing there is always present at least about 100% excess of taurine over that required to react with acyl chloride.

It will also be apparent that, if desired, the reaction may be made completely continuous by suitable modification of the equipment. Thus it is possible to operate so that the equipment is essentially a sump phase reactor once the material in tank 1 has reached the desired degree of conversion. When the desired degree of conversion is reached, finished product may be continuously withdrawn from tank 1 through valved line 8, having flow meter 16 therein, by opening valve 9 therein and the finished material passed to storage. Further quantities of N-methyl taurine and caustic may then be introduced into the reaction through valved line 10 by opening of valve 11 therein, the amount of taurine and caustic introduced through the line 10, as shown by flow meter 15 therein, being equal to the amount withdrawn as such or as acyl tauride through line 8, and the amount of acyl chloride introduced being equivalent to the amount of fatty acids removed as such or as acyl tauride through line 8.

As previously indicated, the conditions of temperature, etc. known in the art for the production of N-acyl taurides can be employed in practicing the present invention. Thus temperatures of from room temperature to about 100° C. or slightly higher can be employed. The reaction is exothermic and ordinarily is operated without either heating or cooling. However, cooling may be furnished, e.g. by means known in the art such as cooling coils or jacket (not shown) on tank 1 or cooling jacket (not shown) on line 4. Similarly if desired, heat may be furnished during the reaction by means known in the art. As indicated by the above specific examples, it is preferable to employ a slight total excess of both the sodium methyl taurate and also the sodium hydroxide over that theoretically required for complete conversion of the fatty acid chloride to the acyl tauride. However, it has been found that somewhat less excess, particularly the sodium methyl tauride, can be employed than was formerly employed. As was common in the art the ratio of alkali metal hydroxide to alkali metal salt of the taurine is preferable in the range of 1.1:1 to 1.4:1.

I claim:

1. In the method of producing long chain fatty carboxyacyl taurides by the reaction of a long chain fatty carboxylacyl chloride with a taurine salt in an aqueous alkaline medium, the improvement which comprises maintaining a circulating aqueous alkaline stream of taurine salt and introducing into and mixing with said stream a long chain fatty carboxyacyl chloride at such a rate that at the point of introduction of said a long chain fatty carboxyacyl chloride there is a substantial excess of said taurine salt to thereby form a partially reacted stream of an aqueous alkaline solution of said taurine salt containing long chain fatty carboxyacyl tauride, recirculating said partially reacted stream and introducing thereinto further quantities of long chain fatty carboxyacyl chloride at such a rate that at the time of introduction of said long chain fatty carboxyacyl chloride there is a substantial excess of said taurine salt.

2. In the method of producing long chain fatty carboxyacyl taurides by the reaction of a long chain fatty carboxyacyl chloride with a taurine salt in an aqueous alkaline medium, the improvement which comprises withdrawing a stream of an aqueous alkaline solution of a taurine salt from a body of the same, introducing into and mixing with said stream a long chain fatty carboxyacyl chloride at such a rate that at the time of introduction of said long chain fatty carboxyacyl chloride there is at least about 10% molar excess of said taurine salt, returning said stream into said body of aqueous alkaline solution of taurine salt and continuing the withdrawal of a stream of an aqueous alkaline solution of said taurine salt containing a long chain fatty carboxyacyl tauride from said body and introducing into the thus withdrawn stream further quantities of a long chain fatty carboxyacyl chloride at such a rate that at the time of introduction of said a long chain fatty carboxyl chloride into said stream there is at least about 10% molar excess of said taurine salt in said stream.

3. The method of producing long chain fatty carboxyacyl taurides by the reaction of a long chain fatty carboxyacyl chloride with a taurine salt in an aqueous medium, the improvement which comprises withdrawing a stream of aqueous alkaline solution of said taurine salt from a body of an aqueous alkaline solution of taurine salt in which the molar ratio of alkali to taurine salt is in the range of 1.1:1.4:1, introducing into and mixing with said stream a long chain fatty carboxyacyl chloride at such a rate that at the time of introduction of said acyl chloride there is at least about 10% molar excess of said taurine salt, returning said stream to said body of aqueous alkaline solution of taurine salt and continuing the withdrawal of a stream of an aqueous alkaline solution of said taurine salt containing a long chain fatty carboxyacyl tauride from said body and introducing into the thus withdrawn stream further quantities of a long chain fatty carboxyacyl chloride at such a rate that at the time of introduction of said acyl chloride into said stream there is at least about 10% molar excess of said taurine salt in said stream.

4. In the method of producing long chain fatty carboxyacyl taurides by the reaction of a long chain fatty carboxyacyl chloride with the sodium salt of methyl taurine in an aqueous solution of sodium hydroxide, the improvement which comprises withdrawing an aqueous solution of sodium hydroxide of the sodium salt of methyl taurine from a body of the same, introducing into and mixing with said stream a long chain fatty carboxyacyl chloride at such a rate that at the time of introduction of said long chain fatty carboxyacyl chloride there is at least about 10% molar excess of said sodium salt of methyl taurine, returning said stream into said body of aqueous solution of sodium hydroxide and sodium salt of methyl taurine and continuing the withdrawal of a stream of said aqueous solution of sodium hydroxide and sodium salt of methyl taurine containing a long chain fatty carboxyacyl tauride from said body and introducing into the thus withdrawn stream further quantities of a long chain fatty carboxyacyl chloride at such a rate that at the time of introduction of said long chain fatty carboxyacyl chloride into said stream, there is at least about 10% molar excess of said sodium salt of methyl taurine in said stream.

5. A continuous method for the production of long chain fatty carboxyacyl taurides by the reaction of a long chain fatty carboxyacyl chloride with a taurine salt in an aqueous alkaline medium which comprises maintaining a circulating aqueous alkaline stream of a taurine salt and said long chain fatty carboxyacyl tauride, continuously withdrawing a portion of said circulating stream, and introducing thereinto additional quantities of a long chain fatty carboxyacyl chloride, taurine salt and alkali substantially equivalent to the amount withdrawn and regulating the rate of introduction of said materials that at the time of introduction of said long chain fatty carboxyacyl chloride, there is at least about 10% molar excess of said taurine salt.

References Cited in the file of this patent

UNITED STATES PATENTS 2,903,466     Walling et al.  ----------- Sept. 8, 1959

FOREIGN PATENTS 532,669     Canada  ---------------- Nov. 6, 1956
512,632     Belgium  ---------------- Feb. 19, 1954